(12) United States Patent
Neale

(10) Patent No.: US 6,631,946 B1
(45) Date of Patent: Oct. 14, 2003

(54) STOWABLE AUTOMOTIVE SEAT ASSEMBLY

(75) Inventor: Colin G. Neale, Northville, MI (US)

(73) Assignee: Magna Interior Systems, Inc., Aurora (CA)

( * ) Notice: Subject to any disclaimer, the term of this patent is extended or adjusted under 35 U.S.C. 154(b) by 0 days.

(21) Appl. No.: 09/701,723
(22) PCT Filed: May 28, 1999
(86) PCT No.: PCT/CA99/00499
§ 371 (c)(1), (2), (4) Date: Jan. 30, 2001
(87) PCT Pub. No.: WO99/62738
PCT Pub. Date: Dec. 9, 1999

Related U.S. Application Data
(60) Provisional application No. 60/087,266, filed on May 29, 1998.

(51) Int. Cl.[7] ................................................. B60N 2/32
(52) U.S. Cl. ...................................................... 297/15
(58) Field of Search .......................... 297/15, 14, 331; 296/66, 65.01, 65.03

(56) References Cited

U.S. PATENT DOCUMENTS

| | | |
|---|---|---|
| 1,245,195 A | 11/1917 | Zimmer |
| 1,261,396 A | 4/1918 | Jackman |
| 1,664,766 A | 4/1928 | Boulogne |
| 2,797,732 A | 7/1957 | Thomas |
| 3,258,259 A | 6/1966 | Bohlin |
| 3,449,012 A | 6/1969 | Caron |
| 3,807,790 A | 4/1974 | Erard |
| 4,227,736 A | 10/1980 | Lebault et al. |
| 4,602,816 A | 7/1986 | Chandler |
| 4,695,094 A | 9/1987 | Siebler |
| 4,699,418 A | 10/1987 | Plavetich |
| 4,986,591 A * | 1/1991 | Martienssen |
| 5,195,795 A * | 3/1993 | Cammera et al. |
| 5,269,581 A * | 12/1993 | Odagaki et al. |
| 5,282,662 A * | 2/1994 | Bolsworth et al. |
| 5,342,111 A * | 8/1994 | Charles |
| 5,547,242 A * | 8/1996 | Dukatz et al. |
| 5,570,931 A * | 11/1996 | Kargilis et al. |
| 5,662,367 A * | 9/1997 | Rastetter et al. |
| 5,730,495 A * | 3/1998 | Tuman, II |

FOREIGN PATENT DOCUMENTS

| | | |
|---|---|---|
| DE | 3102845 | 8/1982 |
| EP | 0177136 | 4/1986 |
| FR | 974883 | 10/1950 |
| FR | 2351819 | 12/1977 |
| FR | 2588171 | 4/1987 |

\* cited by examiner

Primary Examiner—Milton Nelson, Jr.

(57) ABSTRACT

An automotive seating assembly (10) having a seat cushion (22) which is selectively stowed within a floor (14) of a vehicle. A rear support bracket defines a rear portion (36) of the seat cushion (22) and moves between a use position supporting the rear portion (30) above the floor (14) and a stowed position disposed within the floor (14). A front beam (40) defines a front portion (32) of the seat cushion (22) and moves between a use position supporting the front portion (32) above the floor (14) and a stowed position disposed within the floor (14). A flexible mesh material (56) is secured to the front beam (40) at one end (58) and is secured to the rear support bracket (36) at the other end (60) to define a seating portion (34) of the seat cushion (22). The mesh material (56) moves between a support position extending between the front (32) and rear (34) portions above the floor (14) and a retracted position collapsed below the floor (14). A retractor (64) is integrally connected with the mesh material (56) to mount one end of the mesh material to the rear support bracket (36). The retractor (64) retracts the mesh material (56) between the support position with the mesh material (56) unwound from the retractor (64) and the retracted position with the mesh material (56) is stored within the retractor (64) when the rear support bracket (36) and the front beam (40) are in the stowed position disposed within the floor (14).

20 Claims, 5 Drawing Sheets

STOWABLE AUTOMOTIVE SEAT ASSEMBLY

This application claims the benefit of provisional application No. 60/087,266, filed May 29, 1998.

TECHNICAL FIELD

The subject invention relates to an automotive seat assembly which may be partially stowed within a floor of a vehicle.

DESCRIPTION OF THE PRIOR ART

Many vehicle seat assemblies include a bench type seat having a seat cushion portion and a seat back portion. Bench type seats are commonly found in passenger sedans, sport utility vehicles, pickup trucks, vans, and mini-vans. The seat back can be fixedly mounted or pivotally mounted to the seat cushion. A riser is typically mounted to the seat cushion for supporting the bench seat above the vehicle floor. For certain vehicle applications, such as in passenger sedans, the riser is permanently bolted to the vehicle floor. The trend in the sport utility, van, and mini-van industry is to removably mount the riser to the floor such that the bench seat may be easily removed from the vehicle. These risers are commonly mounted to the floor by a number of releasable latches. These bench seats are typically the second or third row rear seats.

To remove the rear seat, a user first releases the latches on the riser. The rear seat may then be carried, slid, or wheeled out of the vehicle. It is desirable to remove these rear seats in order to provide additional cargo space for transporting large or bulky items.

Due to the size and weight of the rear seat, their removal can sometimes be burdensome and difficult to accomplish. Further, the removal may also be impractical and may damage the interior of the vehicle. Finally, the rear seat assembly is relatively large and once removed from the vehicle may be difficult to maneuver and store.

One solution to the above recognized problem is to have a stowable seat assembly which collapses into a floor of a vehicle. Examples of some prior art stowable seat assemblies are shown in U.S. Pat. Nos. 5,195,795 and 5,269,581. These collapsible seat assemblies have the seat back and seat cushion fold onto each other and then collapse into a cavity within the floor. The seat back and seat cushion are of a typical manufacture which includes a frame, foam pad and trim cover material. The seat assembly is therefore relatively bulky and requires a relatively large cavity to be formed within the floor. These current designs occupy a substantial amount of space and in many vehicle designs may be prohibitively too large.

Accordingly, it is desirable to develop a seat assembly which may be stowed within a vehicle, preferably at least partially stowed within a floor of the vehicle, without occupying a large amount of interior space. It is also desirable to have the stowable seat easy to use, lightweight and comfortable.

SUMMARY OF THE INVENTION

An automotive seating assembly is adapted for being at least partially stowed within a floor of a vehicle. The seating assembly comprises a seat cushion having a rear portion and a front portion with a seating portion disposed there between. A rear support bracket defines the rear portion of the seat cushion and is adapted for movement between a use position supporting the rear portion above the floor and a stowed position disposed within the floor. A front beam defines the front portion of the seat cushion and is adapted for movement between a use position supporting the front portion above the floor and a stowed position disposed within the floor. A substantially flexible mesh material has a first end secured to the front beam and a second end secured to the rear support bracket to define the seating portion of the seat cushion and is adapted for movement between a support position extending between the front and rear portions above the floor and a retracted position collapsed below the floor. The seating assembly is characterized by a retractor integrally connected with one of the ends of the mesh material to mount the mesh material to one of the rear support bracket and the front beam for retracting the mesh material between the support position with the mesh material unwound from the retractor and the retracted position with the mesh material wound within the retractor such that the mesh material is stored within the retractor when the rear support bracket and the front beam are in the stowed position disposed within the floor.

Accordingly, the subject invention provides a seat cushion which may be easily stored within a floor of a vehicle. The seat cushion of the subject invention is of a unique and novel construction such that the seat cushion collapses to a relatively thin profile for storage into a relatively small cavity within the floor. The seat cushion is also easy to deploy and store and a mesh material provides a comfortable seating surface.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
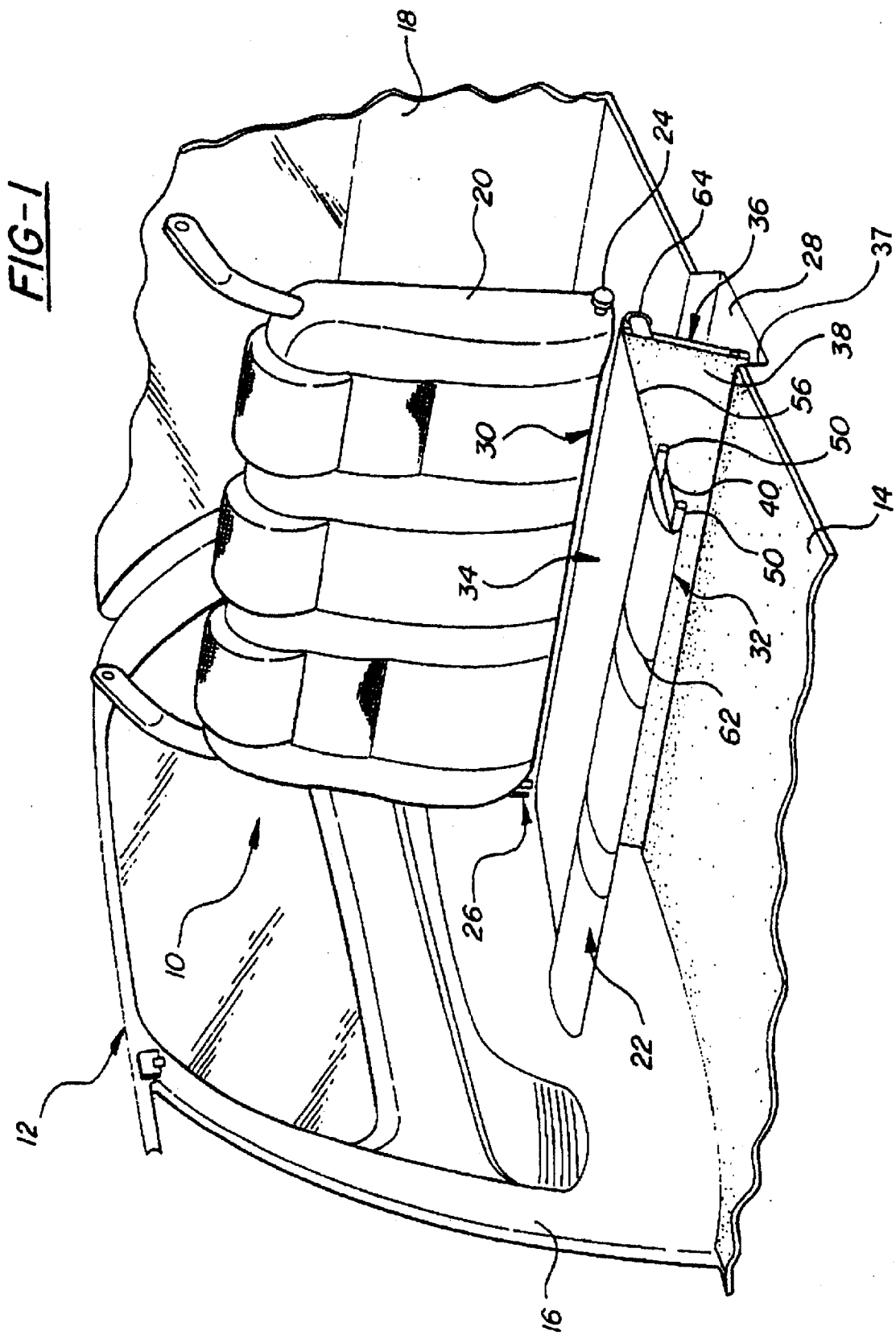
FIG. 1 is a perspective view of an automotive seat assembly in a use position.
Figure 2:
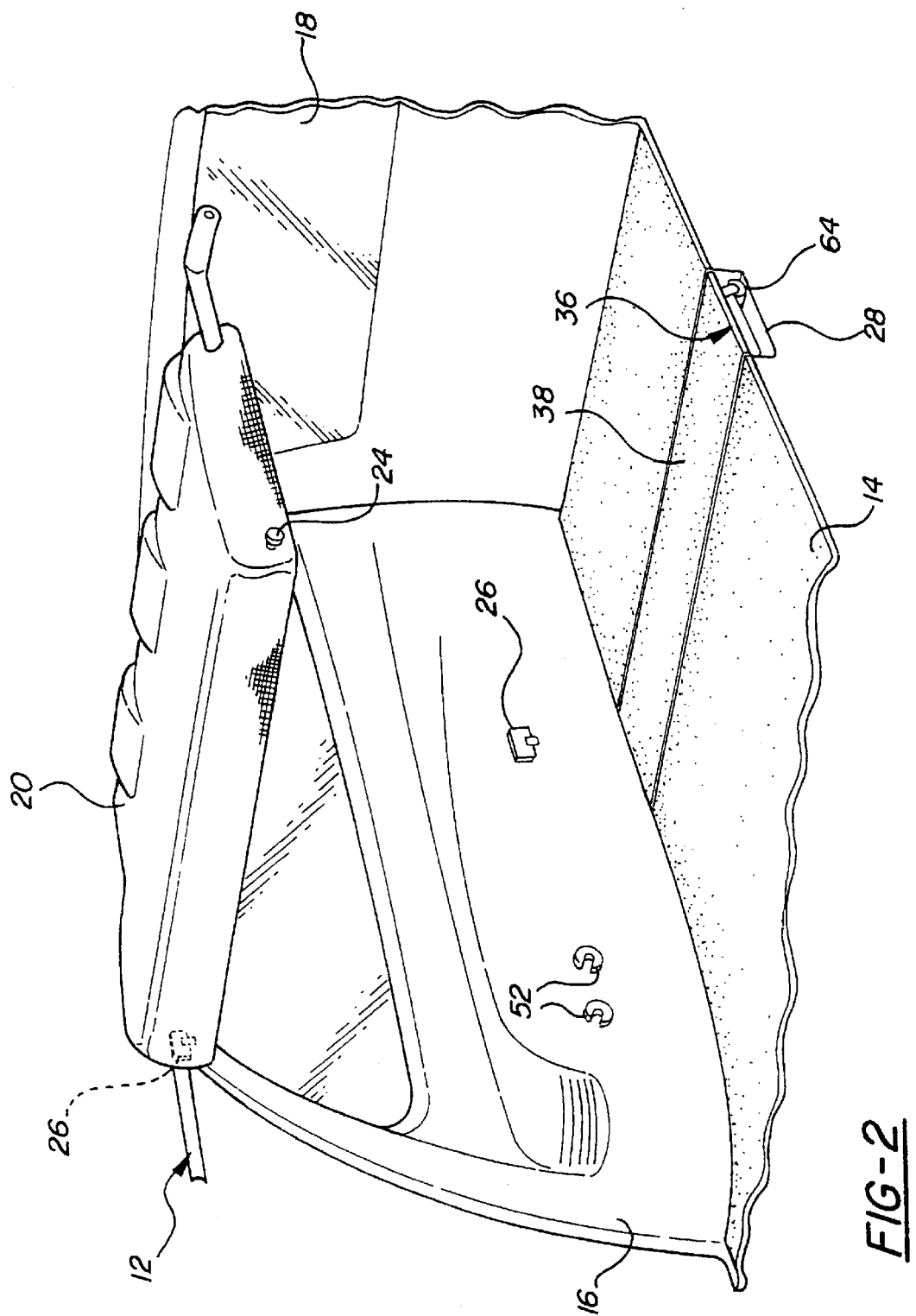
FIG. 2 is a perspective view of the seat assembly in a stowed position.

Referring to the Figures, wherein like numerals indicate like or corresponding parts throughout the several views, an automotive seating assembly adapted for being at least partially stowed within a floor of a vehicle is generally shown at in FIGS. 1 and 2. The seating assembly is shown in a use position in FIG. 1 and in a stowed position in FIG. 2. The seating assembly is shown as a bench type seat mounted within a mini-van type vehicle 12. The vehicle 12 includes a substantially flat floor 14 with a pair of side walls 16.

The floor 14 may be covered with a carpet material or the like. Typically the side walls 16 include a metal inner frame (not shown) covered by a molded plastic which offers an aesthetically pleasing appearance. A rear hatch 18 is disposed within the vehicle 12 such that the hatch 18 may be opened to allow access into the rear of the vehicle 12.

The seat assembly includes a seat back 20 and a seat cushion 22 which are both designed to be stowed within the interior of the vehicle 12, as shown in FIG. 2. The seat back 20 is preferably adapted for pivotal movement between a use position abutting the seat cushion 22 and a stowed position abutting a ceiling (not shown) of the vehicle 12. A locking pin 24 extends from each side of the seat back 20. The locking pin 24 is adapted for selective locking engagement with a latch 26 on the vehicle 12 to secure the seat back 20 in the use and stowed positions. The specifics of the pivotal seat back form the subject matter of an independent invention which is disclosed in application Ser. No. WO 98/41419.

Figure 3:
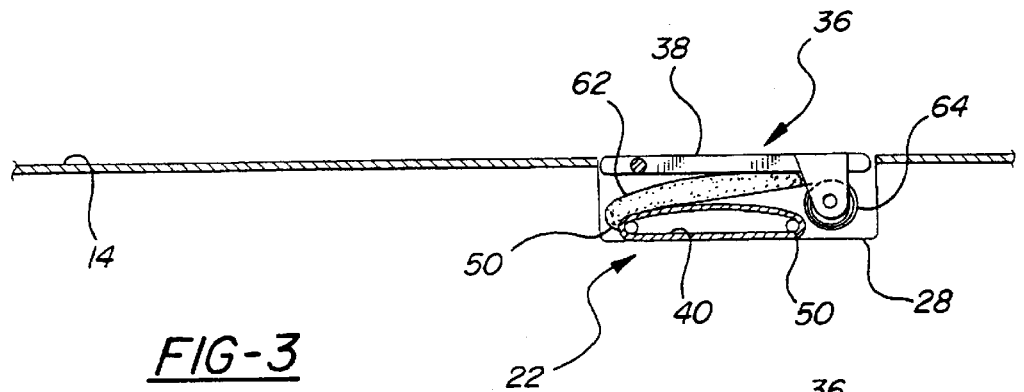
FIG. 3 is a partially cross-sectional side view of a seat cushion in a stowed position.
Figure 4:
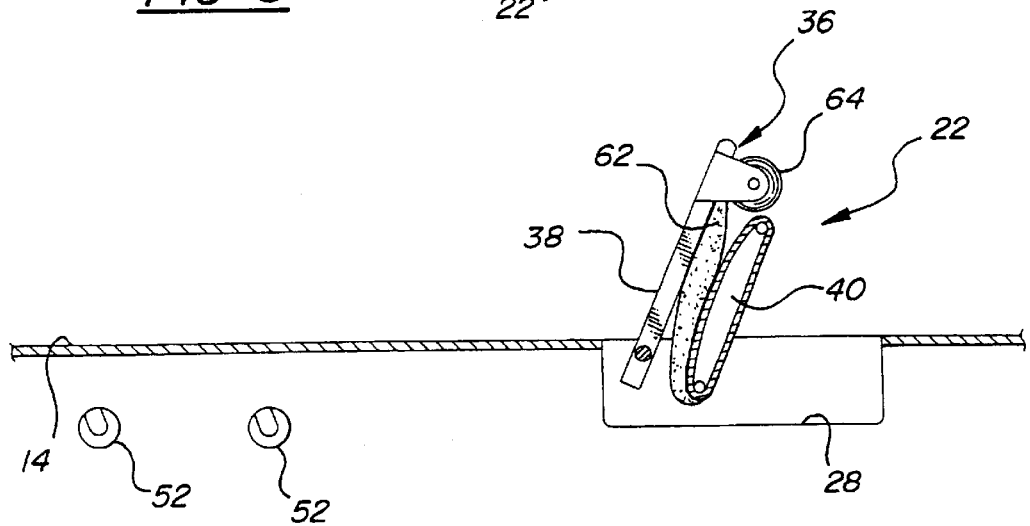
FIG. 4 is a partially cross-sectional side view of the seat cushion in an open position.
Figure 5:
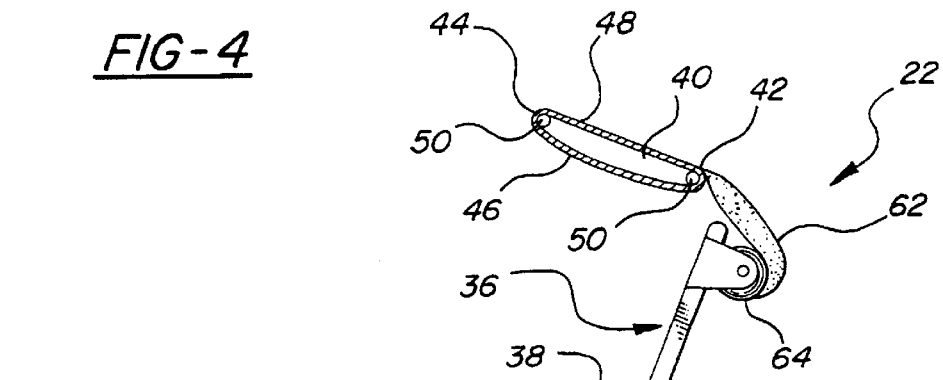
FIG. 5 is a partially cross-sectional side view of the seat cushion in a first partially deployed position.
Figure 6:
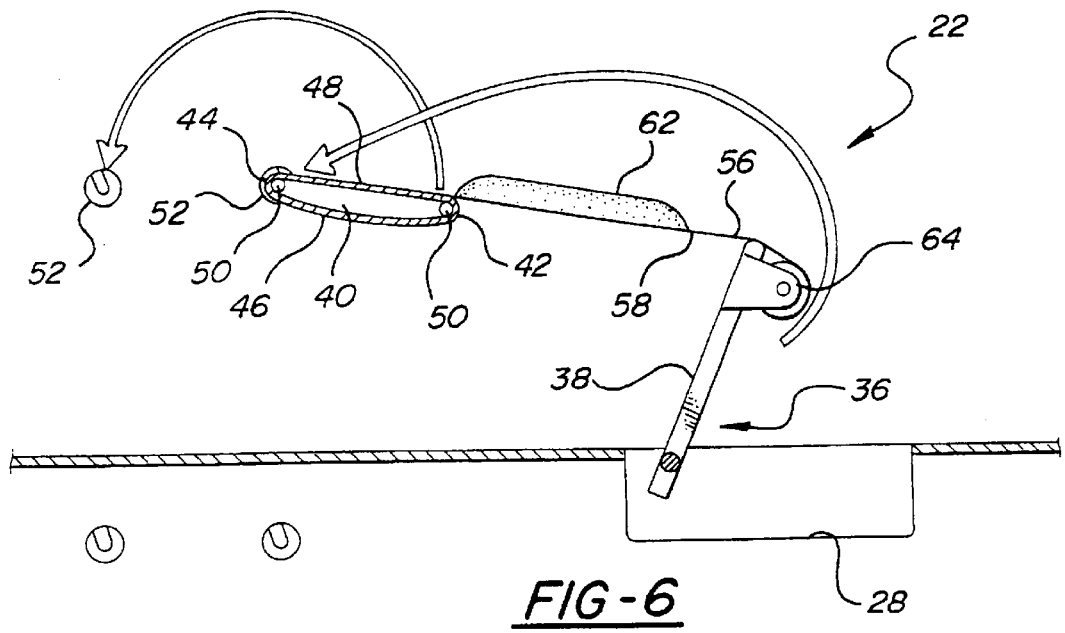
FIG. 6 is a partially cross-sectional side view of the seat cushion in a second partially deployed position.
Figure 7:
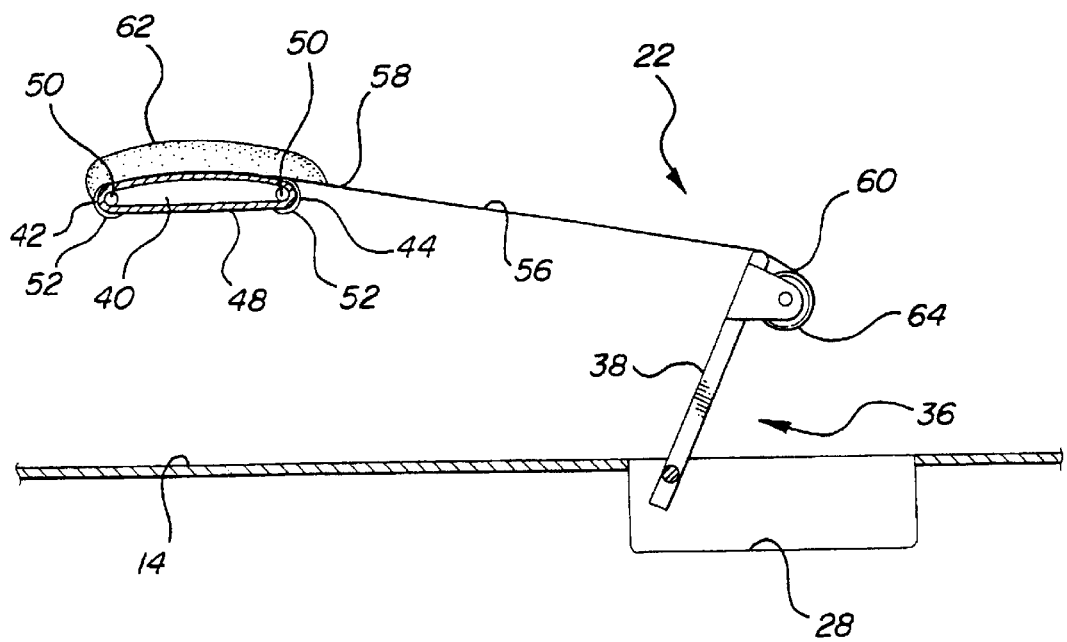
FIG. 7 is a partially cross-sectional side view of the seat cushion in a fully deployed position.

Referring also to FIGS. 3 through 7, the movements of the seat cushion 22 between the use and stowed positions are shown in greater detail. Generally, the seat cushion 22 is designed to be selectively stowed within a cavity 28 in the floor 14 of the vehicle 12. FIG. 3 shows the seat cushion 22 in a stowed position; FIG. 4 shows the seat cushion 22 in an open position; FIGS. 5 and 6 show the seat cushion 22 in partially deployed positions; and FIG. 7 shows the seat cushion 22 in a fully deployed position. The seat cushion 22 generally has a rear portion 30 and a front portion 32 with a seating portion 34 disposed there between. The seat cushion 22 extends across the entire width of the interior of the vehicle 12 and, as discussed in greater detail below, is secured to each side wall 16.

A rear support bracket 36 defines the rear portion 30 of the seat cushion 22 and is adapted for movement between a use position supporting the rear portion 30 above the floor 14 and a stowed position disposed within the floor 14. The side walls of cavity 28 are provided with stops 37 which limit the pivotal movement of bracket 36 in the use position. Preferably, the rear support bracket 36 has a substantially rectangular configuration and is pivotally mounted to the floor 14. The support bracket 36 has an exterior surface 38 for alignment substantially co-planar with the floor 14 of the vehicle 12 when the support bracket 36 is in the stowed position. The exterior surface 38 preferably includes a carpet material or the like which blends with the like material on the floor 14 of the vehicle 12. In other words, the support bracket 36 becomes an integral part of the floor 14 when in the stowed position (FIG. 2). The support bracket 36 also conceals the seat cushion components and closes the cavity 28 within the floor 14 when in the stowed position. As appreciated, the support bracket 36 may be above the floor 14 and/or may be separatable from the floor 14 itself. Alternatively the support bracket 36 may have a U-shaped configuration (not shown) such that the cavity 28 within the floor 14 is eliminated and the seat cushion components are housed within the support bracket 36 against the vehicle floor 14. The support bracket 36 may also be housed within the cavity 28 such that there is a separate removable cover (not shown) to conceal the seat cushion components along with the support bracket 36.

A front beam 40 defines the front portion 32 of the seat cushion 22 and is adapted for movement between a use position supporting the front portion 32 above the floor 14 and a stowed position disposed within the floor 14. The front beam 40 has first 42 and second 44 edges with a curved top 46 and substantially flat bottom 48 forming a substantially hollow beam. As appreciated, the front beam 40 may be of any suitable design or configuration. At least one securing device 50 is mounted to the front beam 40 for securing the front beam 40 to an interior of the vehicle 12. Preferably, there is a securing device 50 mounted at each of the edges 42, 44 for securing both edges 42, 44 of the front beam 40 to the interior of the vehicle 12. The securing devices 50 are a pins extending from the first 42 and second 44 edges of the front beam 40.

Figure 8:
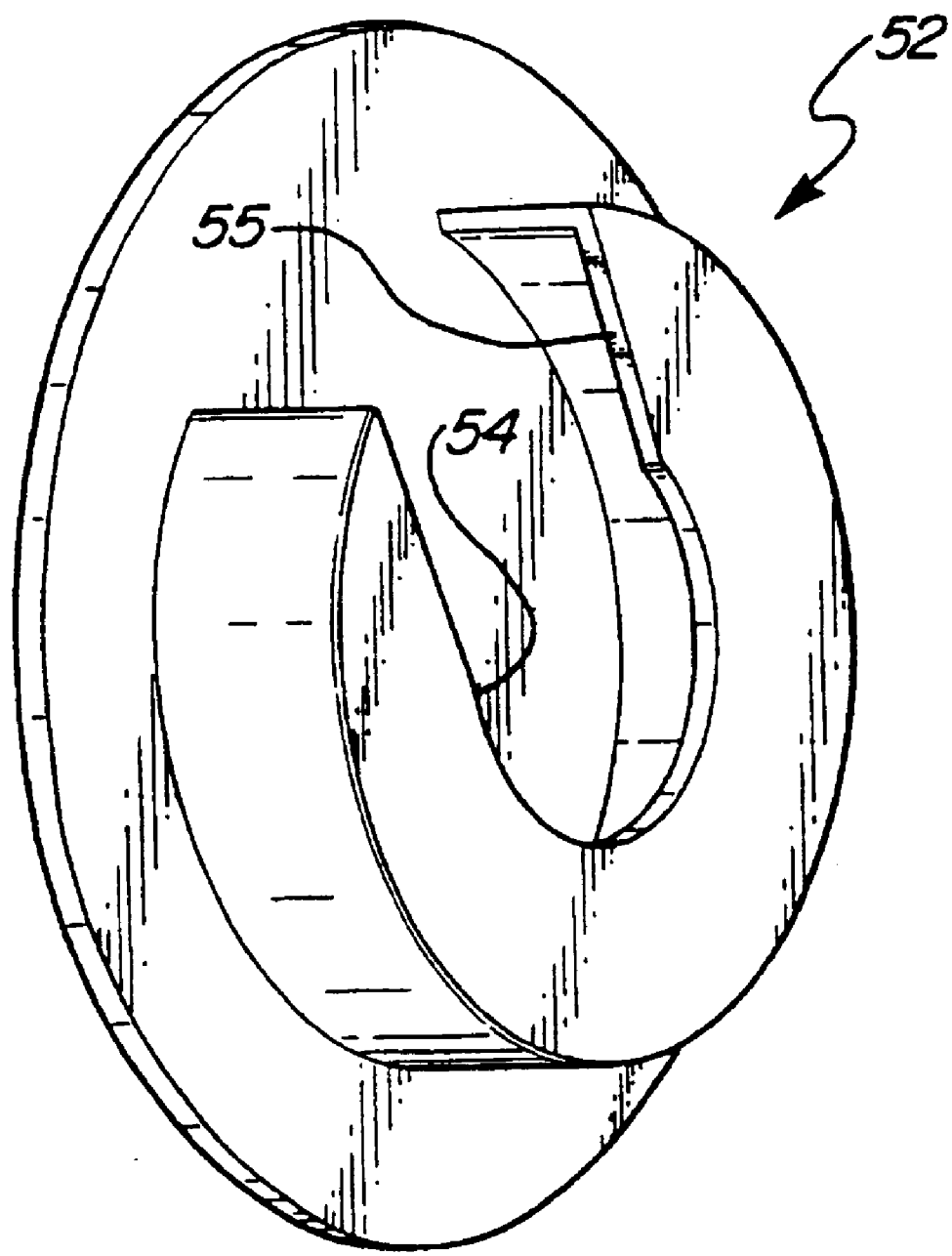
FIG. 8 is a perspective view of the latch for securing the seat cushion in the deployed position.

The securing devices, or pins, 50 are mounted to corresponding latches 52 disposed on an interior surface of the vehicle 12. Preferably, the latches 52 have substantially C-shaped slots 54 and are secured to the side walls 16, or wheel wells, of the interior surface of the vehicle 12. The latches 52 may include a locking mechanism, as commonly known in the art, and are angled forwardly to assists in mounting the front beam 40. FIG. 8 discloses the latch 52 with the C-shaped slot 54 having a ramped entrance surface 55 for receiving the pin 50 therein. It is appreciated, that the latches 52 and pins 50 may be of any suitable design or configuration. Further, it is appreciated that the latches 52 may be mounted to the front beam 40 with the pins 50 extending from the side walls 16 of the vehicle 12.

A substantially flexible mesh material 56 has a first end 58 secured to the front beam 40 and a second end 60 secured to the rear support bracket 36 to define the seating portion 34 of the seat cushion 22. The mesh material 56 is adapted for movement between a support position extending between the front 32 and rear 34 portions above the floor 14 and a retracted position collapsed below the floor 14. Specifically, the first end 58 of the mesh material 56 is mounted to the first edge 42 of the front beam 40 with the mesh material 56 extending over the front beam 40 when the front beam 40 is in the use position. The mesh material 56 also extends entirely across the longitudinal width of the front beam 40 for providing a complete seating surface for the seat cushion 22.

A foam pad 62 is disposed on at least a portion of the flexible mesh material 56. Specifically, the foam pad 62 is mounted to the mesh material 56 adjacent the first end 58 with the foam pad 62 also extending over the front beam 40 when the front beam 40 is in the use position. This location of the foam pad 62 is desired such that the mesh material 56 may be easily and completely retracted into the retracted position. The foam pad 62 provides a padded surface for the leading edge, or first edge 42, of the front beam 40. As appreciated, the foam pad 62 may be made of any suitable material and may be secured to any suitable portion of the mesh material 56.

The seating assembly 10 is characterized by a retractor 64 integrally connected with one of the ends 58, 60 of the mesh material 56 to mount the mesh material 56 to one of the rear support bracket 36 or the front beam 40. The retractor 64 retracts the mesh material 56 between the extended support position with the mesh material 56 unwound from the retractor 64 and the retracted position with the mesh material 56 wound within the retractor 64 such that the mesh material 56 is stored about the retractor 64 when the rear support bracket 36 and the front beam 40 are in the stowed position disposed within the floor 14. Preferably, the retractor 64 is fixedly mounted to the rear support bracket 36 with the second end 60 of the mesh material 56 connected to the retractor 64. Specifically, the retractor 64 is mounted to an interior surface of the support bracket 36 such that the support bracket 36 conceals the retractor 64 when in the stowed position. The retractor 64 therefore moves in unison with the support bracket 36 between the use and stowed positions. The retractor 64 may be of any suitable design as is known in the art.

As shown in FIG. 3, the retractor 64, mesh material 56, foam pad 62, front beam 40 and other components of the seat cushion 22 are housed within the cavity 28 in the floor 14 when in the stowed position. In other words, the seat cushion components are captured between the support bracket 36 and the cavity 28.

As shown in FIGS. 3 and 4, the mesh material 56 is completely wound within the retractor 64. FIGS. 5 and 6 disclose the mesh material 56 partially unwound and FIGS. 1 and 7 show the mesh material 56 completely unwound from the retractor 64. Preferably, the first end 58 of the mesh material 56 is always outside the retractor 64 and the second end 60 of the mesh material 56 is always secured within the retractor 64.

The deployment of the seat cushion 22 is accomplished by the following operation. The support bracket 36 is first pivoted upward from the floor 14 to expose the front beam 40, as shown in FIG. 4. The front beam 40 is then pulled upward and outward along with the mesh material 56 away from the support bracket 36, as shown in FIG. 5. As the front beam 40 and mesh material 56 are pulled away, the mesh material 56 automatically unwinds from the retractor 64. Specifically, the mesh material 56 extends from the retracted position wound within the retractor 64 to the support position unwound from within the retractor 64. The second edge 44 of the front beam 40 is then secured to the first latch 52 which is spaced from the support bracket 36. Specifically, the pin 50 extending from the second edge 44 of the front beam 40 engages the slot 54 within the first latches 52 to pivotally retain the second edge 44 of the front beam 40 against the side walls 16. Simultaneously, the mesh material 56, which has the foam pad 62 mounted thereto, partially unwinds from the retractor 64 and the foam pad 62 straightens as shown in FIG. 6.

The first edge 42 of the front beam 40 is then lifted and the front beam 40 is rotated substantially 180° about the second edge 44 as indicated by the arrows. The first edge 42 of the front beam 40 is then secured to the second latch 52 which in turn secures the entire seat cushion 22 to the side walls 16. As discussed above, the mesh material 56 is secured to the first edge 42 of the front beam 40. Hence, the mesh material 56 simultaneously unwinds from the retractor 64 as the front beam 40 is pivoted 180° such that the mesh material 56 extends over the front beam 40. The mesh material 56 is now fully extended to provide a taught seating surface between the front beam 40 and the rear support bracket 36, as shown in FIG. 7. The fully taught mesh material 56 can now support the weight of a passenger. As appreciated, the mesh material 56 may be mounted to the second edge 44 of the front beam 40 such that the mesh material 56 and foam pad 62 do not extend over the front beam 40. In addition, the front beam 40 may pivot through more or less than 180° or may not pivot at all. Although not specifically shown, a locking device may be disposed within the retractor 64 to prevent any further deployment of the mesh material 56. Alternatively, the mesh material 56 could be of a specified length such that the entire length is withdrawn when in the fully deployed position.

To return the seat cushion 22 to the stowed position within the cavity 28, the user releases the first 42 and second 44 edges of the front beam 40 from the side walls 16 and moves the front beam 40, along with the mesh material 56 and foam pad 62, near the support bracket 36. The retractor 64 automatically winds up the mesh material 56. The user then places all of the seat cushion components into the cavity 28 and then closes the support bracket 36 flush with the vehicle floor 14, as shown in FIGS. 2 and 3.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that, within the scope of the appended claims, the invention may be practiced otherwise than as specifically described.

What is claimed is:

1. An automotive seating assembly adapted for being at least partially stowed within a floor of a vehicle, said seating assembly comprising;

a seat cushion having a rear portion and a front portion with a seating portion disposed there between, a rear support bracket defining said rear portion of said seat cushion and adapted for movement between a use position supporting said rear portion above the floor and a stowed position disposed within the floor, a front beam defining said front portion of said seat cushion and adapted for movement between a use position supporting said front portion above the floor and a stowed position disposed within the floor, and a substantially flexible mesh material having a first end secured to said front beam and a second end secured to said rear support bracket to define said seating portion of said seat cushion and adapted for movement between a support position extending between said front and rear portions above the floor and a retracted position collapsed below the floor, said seating assembly characterized by a retractor integrally connected with one of said ends of said mesh material to mount said mesh material to one of said rear support bracket and said front beam for retracting said mesh material between said support position with said mesh material unwound from said retractor and said retracted position with said mesh material wound within said retractor such that said mesh material is stored within said retractor when said rear support bracket and said front beam are in said stowed position disposed within the floor.

2. An assembly as set forth in claim 1 further including at least one securing device mounted to said front beam for securing said front beam to an interior of the vehicle.

3. An assembly as set forth in claim 2 wherein said front beam includes first and second edges with a securing device mounted at each of said edges for securing both edges of said front beam to the interior of the vehicle.

4. An assembly as set forth in claim 3 wherein said first end of said mesh material is mounted to said first edge of said front beam with said mesh material extending over said front beam when said front beam is in said use position.

5. An assembly as set forth in claim 4 wherein said mesh material extends entirely across the longitudinal width of said front beam for providing a complete seating surface for said seat cushion.

6. An assembly as set forth in claim 4 further including a foam pad disposed on at least a portion of said flexible mesh material.

7. An assembly as set forth in claim 6 wherein said foam pad is mounted to said mesh material adjacent said first end with said foam pad extending over said front beam when said front beam is in said use position.

8. An assembly as set forth in claim 7 wherein said retractor is fixedly mounted to said rear support bracket and moves in unison with said support bracket between said use and stowed positions.

9. An assembly as set forth in claim 8 wherein said rear support bracket is adapted to be pivotally mounted to the floor and has an exterior surface for alignment with the floor of the vehicle when said support bracket is in said stowed position.

10. An assembly as set forth in claim 8 further including a seat back adapted for pivotal movement between a use position abutting said seat cushion and a stowed position abutting a ceiling of the vehicle.

11. An assembly as set forth in claim 10 further including a locking pin extending from each side of said seat back adapted for selective locking engagement with a latch on the vehicle to secure said seat back in said use and stowed positions.

12. A seat cushion having a rear portion and a front portion with a seating portion disposed therebetween, and adapted to be at least partially stowed within a floor of a vehicle, said seat cushion comprising:

a rear support bracket defining said rear portion of said seat cushion and adapted for movement between a use position for supporting said rear portion above the floor and a stowed position disposed within the floor, a front beam defining said front portion of said seat cushion and adapted for movement between a use position supporting said front portion above the floor and a stowed position disposed within the floor, and a substantially flexible mesh material having a first end secured to said front beam and a second end secured to said rear support bracket to define said seating portion of said seat cushion and adapted for movement between a support position extending between said front and rear portions above the floor and a retracted position collapsed below the floor, said seating cushion characterized by a retractor integrally connected with one of said ends of said mesh material to mount said mesh material to one of said rear support bracket and said front beam for retracting said mesh material between said support position with said mesh material unwound from said retractor and said retracted position with said mesh material wound within said retractor such that said mesh material is stored within said retractor when said rear support bracket and said front beam are in said stowed position disposed within the floor.

13. A seat cushion as set forth in claim 12 further including at least one securing device mounted to said front beam for securing said front beam to an interior of the vehicle.

14. A seat cushion as set forth in claim 13 wherein said front beam includes first and second edges with a securing device mounted at each of said edges for securing both edges of said front beam to the interior of the vehicle.

15. A seat cushion as set forth in claim 14 wherein said first end of said mesh material is mounted to said first edge of said front beam with said mesh material extending over said front beam when said front beam is in said use position.

16. A seat cushion as set forth in claim 15 wherein said mesh material extends entirely across the longitudinal width of said front beam for providing a complete seating surface for said seat cushion.

17. A seat cushion as set forth in claim 15 further including a foam pad disposed on at least a portion of said flexible mesh material.

18. A seat cushion as set forth in claim 17 wherein said foam pad is mounted to said mesh material adjacent said first end with said foam pad extending over said front beam when said front beam is in said use position.

19. A seat cushion as set forth in claim 18 wherein said retractor is fixedly mounted to said rear support bracket and moves in unison with said support bracket between said use and stowed positions.

20. A seat cushion as set forth in claim 19 wherein said rear support bracket is adapted to be pivotally mounted to the floor and has an exterior surface for alignment with the floor of the vehicle when said support bracket is in said stowed position.

* * * * *